United States Patent [19]

Olesen

[11] Patent Number: 4,881,825

[45] Date of Patent: Nov. 21, 1989

[54] CONTAINER AND A METHOD AS WELL AS AN ASSEMBLY FOR ITS MANUFACTURE

[75] Inventor: Ejvid H. B. Olesen, Mariager, Denmark

[73] Assignee: Unibag A/S, Roslev, Denmark

[21] Appl. No.: 175,260

[22] Filed: Mar. 30, 1988

[30] Foreign Application Priority Data

Mar. 30, 1987 [DK] Denmark ............................ 1619/87

[51] Int. Cl.$^4$ ............................................ F16C 32/06

[52] U.S. Cl. .................................... 383/906; 383/120

[58] Field of Search .................... 383/120, 906, 42, 44, 383/50, 51, 55, 66, 100, 104, 904; 229/DIG. 14

[56] References Cited

U.S. PATENT DOCUMENTS

| | | | |
|---|---|---|---|
| 1,623,107 | 4/1927 | Goodykoontz | 383/904 |
| 3,367,380 | 2/1968 | Dickey | 383/906 |
| 4,071,187 | 1/1978 | Lafleur | 229/DIG. 14 |
| 4,452,378 | 6/1984 | Christine | 383/125 |
| 4,685,148 | 8/1987 | Titchenal | 383/904 |

*Primary Examiner*—Willis Little
*Attorney, Agent, or Firm*—Cooper & Dunham

[57] ABSTRACT

In a container (1) of flexible material and including a tube-shaped blank divided into two opposite side walls (5) and two intermediate pairs of gusset walls (6) by means of gussets (2, 3), and having at least one block bottom (8, 9), a tightly sealed, outwardly folding discharge valve (11) is provided in the block bottom (8), said discharge valve being resealable and provided with a gripping means (16). The opening of the valve is formed by shortening a part of the floded end area to predominatly the same length as the depth (19) of the guesset (2).

When manufacturing the container (1) from tubing, it is gusseted and divided into blanks corresponding to the container. Then a part of the end area of the blank is cut along a first intersection parallel and adjacent to the middle fold (7) in one of the gussets (2) when the blank is folded up, and along a second, transverse intersection (23) one gusset depth (19) apart from the fold lines (25) around which the final folding of the side walls is performed, whereupon the block botton (8) is folded, while optionally mutually glueing or welding the folded side walls. Only the parts of the block bottom (8) not in touch with the gusset walls (6) with the cutout optionally glued or welded.

The resulting container with block bottom has a well functioning resealable discharge valve and is suitable for manufacture in a continuous process from an endless material without use of extra material.

19 Claims, 11 Drawing Sheets

SECTION A-A

SECTION A-A

SECTION C-C

SECTION B-B

SECTION D-D

SECTION a-a

SECTION b-b

SECTION c-c

CONTAINER AND A METHOD AS WELL AS AN ASSEMBLY FOR ITS MANUFACTURE

FIELD OF THE INVENTION

The invention relates to a container, especially a bag, of flexible material, such as paper, plastic film, foil or similar materials, and of the type comprising a tube-shaped blank divided by means of gussets into two opposite side walls and two intermediate pairs of gusset walls, and having at least one bottom of the block bottom type including a folded end area of said side walls and said pairs of gusset walls.

BACKGROUND ART

Known containers of this type are provided with discharge valves of different shapes, where the valve is either formed by special parts inserted in the container and/or formed by areas of the container to be folded in and out. Such containers are, however, difficult to manufacture and are either not very tight or require more material than is necessary or desirable.

SUMMARY OF THE INVENTION

The object of the invention is to provide a container of the kind described in the introduction and having a satisfactorily functioning, resealable discharge valve without incurring unnecessary use of material, and suitable for continuous manufacture from an endless tube- or strip-shaped material.

The object of the invention is accomplished by providing a container characterized in that the container includes a tightly sealed, outwardly folding discharge valve in one of the said block bottoms, said valve being resealable and provided with a gripping means, and its opening being provided by means of shortening at least a part of the folded end areas of one pair of gusset walls and adjacent side walls to predominantly the same length as the depth of the gusset. A further advantage besides the efficient and material-saving manufacture is that the discharge valve is tightly sealed when closed and that it is easy to open and close the valve with regard to repeated discharges of part of the content of the container without destroying the latter. Moreover, the content is easily poured from the special discharge valve, since the valve forms a spout enabling an exact dosage of the amount to be discharged. Since the container is not destroyed, it can be reused after being refilled again.

With regard to easy pouring of especially viscous or rough materials the inventive container is provided with an especially suitable spout, where at least parts of the shortened end areas are further shortened to a length shorter than the gusset depth, especially along straight and/or curved intersections preferably symmetrical around the middle fold.

With regard to stabilizing the block bottom and to further sealing of the valve against unintended discharge of the content during transport and storage the inventive container is provided with a cover sheet fastened to the outer surface of the block bottom and with a tear-off section on top of the discharge valve, said tear-off section acting as the gripping means and being separately attached to the main section of the sheet along a weakened belt, said weakened belt extending predominantly parallel to the gusset side of the block bottom and preferably one gusset depth apart from said gusset side of the block bottom and comprising tearing-off means, and the tear-off section is fastened to the discharge valve of the bottom in an area along the middle fold, and the main section of the sheet is fastened to the block bottom at least outside a central area of the main section of the sheet.

The cover sheet is advantageously provided with a preferably oblong central section in the central area of the main section and separated from the remaining part of the main section along its longitudinal sides and connected with the main section along its narrow sides, where only those parts of the main section situated outside the central section are glued to the block bottom, and additionally the longitudinal direction of the central section is preferably parallel to the connecting line between the opposing gusset sides. As a result the central section serves as a handle for a better opening and shaping of the discharge valve and thus an easier discharge and an easier handling of the container. This is due to the side walls of the container being affected by the handle when the handle is raised during the discharge of the content of the container through the discharge valve. The handling of the container is further facilitated by inserting a cover sheet with handle at both ends of the container, thus also enabling more than one person to easily carry a heavy container.

In an especially preferred embodiment of the invention the container is provided with a bottom flap fastened to the inner side of the side walls of the block bottom, said flap extending partially past the ends of the folded gusset walls in the direction of the gusset side of the container at the end of the block bottom with the discharge valve, and at the opposite end extending almost completely to the gusset side, and in the transverse direction in relation hereto, having predominantly the same dimensions as the block bottom, and the flap is situated inside the container in relation to the walls of the block bottom at the end including the discharge valve, thus acting as an inner seal of the discharge valve, and at the opposite end of the block bottom the flap is situated between the folded gusset walls and the side walls, said flap comprising one or optionally more partially interconnected layers of material. As a result, the flap forms a labyrinth seal for the discharge valve. Simultaneously it forms an opening either alone or in combination with the gusset areas in the opposite side of the container, said opening acting as an airing valve allowing the admission of air into the container during the discharge in order to replace the discharged material. Thus the discharge is facilitated and irritating dust is returned to the container by way of the admitted air. Moreover, the opening formed by the flap can be used as a charging opening for the container.

In another preferred embodiment of the inventive container the cover sheet and the flap are interconnected at the gusset side opposite the discharge valve, preferably being integrally formed and doubled back at said side. As a result, the manufacture of the container is simplified and less expensive as well as the fastening of the handle in the container strengthened.

As mentioned above the container can have one or two end bottoms of the block bottom type. Containers having two block bottoms are normally provided with a charging valve for facilitating mechanical filling.

The above described container is thus provided with a combined charging, discharge and closing valve as well as a handle, said container being used in form of bags and sacks as well as cardboard boxes, canisters and similar packing means of preferably box-like shape. Materials to be used include paper and plastic film as well as other types of foil, leather, textiles and combinations of these materials, such as plastic-coated paper or textiles. Moreover packing means are included, where part of the packing is of a material different from the material of the rest of the packing means, such as in the block bottom or in the gusset walls.

The present invention is not limited to such containers, where the charging valve is situated in the same block bottom as the discharge valve. Apart from the discharge valve described in claim 1 other types of discharge valves can be used. The same applies to other types of charging valves.

If the container is provided with one block bottom with discharge valve, the container can be used for manual as well as mechanical filling without a special charging valve.

With regard to a better repeated closing of the discharge valve its walls can be provided with means for repeated opening and closing, such as Velcro ® tape or a self-adhesive agent, and/or the point of the spout is folded under the edge of the main section of the cover sheet. In order to facilitate the opening of the discharge valve the weakened belt of the cover sheet can include a tear-off string or another tearing-off means to be used partially for the separation of the tear-off section of the cover sheet from its main section and partially, together with the tear-off section, as a gripping means for the opening of the discharge valve. In this embodiment the tear-off section in the cover sheet, or optionally the special tearing-off means, is fastened to the gusset walls with a specially strong glue, such as hotmelt or the like, the glue being preferably applied symmetrically around the middle fold.

Apart from the tear-off section of the cover sheet the gripping means can also comprise a non-cut part of the gusset walls, preferably symmetrical around the middle fold, and optionally including one or more built-in reinforcement strings, or special gripping means, such as strings, loops or the like, or optionally molded means fastened to the valve walls.

For a further strengthening of the block bottom the flap can be shaped like a flat tube, the two layers of which are glued to the outer side of the folded gusset walls opposite the discharge valve and to the folded side walls, respectively.

The invention further relates to a method for manufacture of a container, especially a bag of flexible material, such as paper, plastic film, foil or similar materials, as described in claim 1, during which an endless tubing is fed or prepared from an endless length and fed and gusseted as well as divided into tube-shaped, gusseted blanks corresponding to the individual container, whereupon one or both ends of the blank are folded to form the bottom surfaces according to the block bottom principle, where at first the two side walls, which have been put together face to face, are separated from each other and folded outward from the free end of the blank along a distance of between two and three times the gusset depth as from the free end of the blank, simultaneous with the inward folding of the gusset walls and part of the side walls from both gusset sides of the blank, whereupon the outwardly folded parts of the side walls are folded along the fold lines identical with the original outer folds of the folded gusset walls, and where optionally at least parts of the folded gusset walls are glued or welded together, said method being characterized in that preferably prior to the dividing of the individual blanks at least a part of the leading end area of said blank in the area of one of the gussets is cut out along a first intersection parallel and close to the middle fold of the blank and a second intersection transverse to the first one and at a distance of substantially at the most once the gusset depth from the fold lines around which the final folding of the side walls is performed, and, in connection with this final folding of the side walls, the welding or the application of glue is performed in such a way that only those parts of the block bottom out of contact with the gusset walls, where the cutout has been performed, are glued or welded together. As a result the method operates continuously and with an endless material, which constitutes a less expensive manufacture.

The inventive container can also be prepared from tube-shaped, gusseted blanks or from containers with one block bottom by inserting a flap according to the block bottom principle in one end of the tube-shaped, gusseted blank corresponding to a container with inwardly facing gussets or in the open end of a container with a previously formed block bottom. Then the cutout in the leading end area of the blank or container is performed, whereupon the manufacture continues as described above. Thus a more extensive use of existing assemblies for the manufacture of containers is obtained, i.e. a further diminishing of the manufacture costs and a greater flexibility.

According to both methods a specially shaped cover sheet is glued to the outer surface of the block bottom subsequent to the final folding of the side walls, said cover sheet being divided into a tear-off section and a main section as well as an intermediate weakened belt, the gluing being performed in such a way that the tear-off section is glued to the parts of the gusset walls forming the discharge valve along an area around its middle fold and with the weakened belt situated predominantly on top of the free end of these gusset walls, while the main section, with the exception of the central section separated from the main section along two opposite sides but connected thereto at the ends thereof, is glued in such a way to the remaining part of the outer surface of the block bottom that the central section is usable as a handle for the container. This results in an improved long-time sealing of the valve during transport and storage. Moreover it is an efficient method for the manufacture of the integrally formed handle and tear-off section of the container.

Preferably, the flap is inserted in the block bottom prior to the final folding of the side walls in such a way that the flap extends across the folded gusset walls at the gusset side without cutout and partially inside below the folded gusset walls with cutouts, while the gusset walls are kept at an upwardly and downwardly inclined position, whereupon the flap is glued or welded to the folded side walls during the final folding of said side walls, thus ensuring correct insertion of the flap.

When the free end of the main section of the cover sheet opposite the tear-off section is integral with the end of the flap extending across the folded gusset walls without cutout, it is advantageous to insert the cover sheet together with the flap in a protruding position, whereupon the cover sheet is folded over the block bottom and glued to the outer surface thereof subsequent to the folding and fastening of the side walls. As a result, an especially simple simultaneous insertion of the flap and the cover sheet is obtained, thus saving further steps in the operation.

The invention also relates to an assembly for the continuous manufacture of a tube-shaped container closed at one or both ends by means of a block bottom, especially a bag with a block bottom, from an endless tubing or a strip-shaped length of flexible material according to the method described in claim 7, and comprising a tubing means, a gusseting means, a blank divider, a first block bottom folder, a turning means and a second block bottom folder, said assembly being characterized in that it comprises an edge assembling means cooperating with the gusseting means for gluing the edges of the length, a roller puncher tool between the gusseting means and the first block bottom folder for making a cut for a discharge valve in one of the gusset areas, a gripping means adjacent the blank divider for removing and collecting superfluous, punched out material, an insertion means in the first block bottom folder for inserting the flap in the opened block bottom, and an layer-on means behind the first block bottom folder for laying on and fastening of the cover sheet. Such an assembly continuously manufactures finished containers with block bottoms, where at least one of the block bottoms is provided with a discharge valve optionally provided with extra transport and storage seals.

In a second embodiment the assembly is arranged for the manufacture of containers from tube-shaped, gusseted blanks or e.g. containers with one block bottom, and the assembly comprises only one block bottom folder and is characterized in that the assembly comprises a roller puncher tool in front of the block bottom folder for making a cut for the discharge valve in one of the gusset areas, a gripping means for removing and collecting superfluous, punched out material, an insertion means in the block bottom folder for inserting the flap in the opened block bottom, and a layer-on means behind the block bottom folder for laying on and fastening of the cover sheet. Such an assembly is, of course, less expensive than the one described above.

In a third embodiment of the inventive assembly for the manufacture of containers from tube-shaped, gusseted blanks or e.g. containers with one block bottom, where the assembly again comprises only one block bottom folder and is characterized in that it comprises a roller puncher tool in front of the block bottom folder for making a cut for the discharge valve in one of the gusset areas, and a gripping means for removing and collecting superfluous, punched out material. In this embodiment the blank can thus be provided with a cut for the discharge valve at one end as well as with an open and folded but unglued block bottom. Then the container is transferred to another assembly for inserting a flap in the open block bottom as well as for folding and gluing of the block bottom and gluing of the cover sheet optionally provided with tearing/perforation arrangement for the embodiment with handle.

Advantageously the roller puncher tool for making a cut for the discharge valve comprises a pair of rollers surrounding the length including a cutting roller and a correspondingly shaped matrix roller, where the cutter is substantially L-shaped and provided with a first web in a normal plane to the axis of the cutting roller opposite one middle fold of the gusseted tubing, and with a second web extending from the one end of the first web passed the side edge of the tubing, preferably at least partially curved and with the convex side facing the same side as the first web. This embodiment is especially suitable in connection with continuous manufacture. Different roller puncher tools can also be used, such as those equipped with reciprocating roller punchers.

The gripping means for removing and collecting superfluous, punched-out material comprises suction cups in the bottom roller of a set of cutting rollers for the punching out of said material as well as a collecting tray below said bottom roller. This is a practical position for continuous manufacture. Preferably the tools for making cuts for the discharge valve and cuts for the division of the blanks as well as the suction cups for removing punched-out, superfluous material are installed in the same set of rollers, resulting in a short length of the assembly. On the other hand, when they are separate, it is less expensive to exchange the individual parts, especially the cutting tools for the discharge valve if their shape is to be altered.

In an especially practical and safe embodiment of the inventive assembly the insertion means for inserting the flap in the block bottom comprises a bottom cylinder and a roller with suction cups mounted at the periphery of said cylinder for raising the gusset walls folded at the side of the discharge valve, a magazine for flaps and a roller with suction cups mounted at the periphery of the bottom cylinder for taking out the flap from the magazine and guiding it down to the block bottom below the raised gusset walls, as well as corresponding moving and control means, the control means comprising a photo-cell for detecting a correctly positioned container in the assembly and for transmitting a signal to means for guiding down the flap to the block bottom, when the container is in the correct position. Furthermore in this especially practical and safe embodiment the layer-on means for laying on and fastening of the cover sheet comprises a set of rollers cooperating with a separate bottom cylinder for the application of glue, and a folding mechanism for folding a cover sheet integral with an inserted flap and protruding from the block bottom over said block bottom, as well as a magazine for cover sheets and a roller with suction cups for taking out and guiding down of the individual cover sheet from the magazine to the block bottom and for pressing the cover sheet onto the outer surface of the block bottom.

Advantageously the edge assembling means cooperating with the gusseting means for gluing of the side edges of the length comprises a heating unit, such as a gas flame, for melting or softening of a glue or the surface material of the length on one side edge of the length as well as means, such as pairs of rollers for pressing the two side edges against each other, thus presenting an inexpensive and simple embodiment of the means.

BRIEF DESCRIPTION OF THE DRAWINGS

The invention is described in greater detail below and with reference to the accompanying drawings, in which.

DESCRIPTION OF THE PREFERRED EMBODIMENTS

Figure 2:
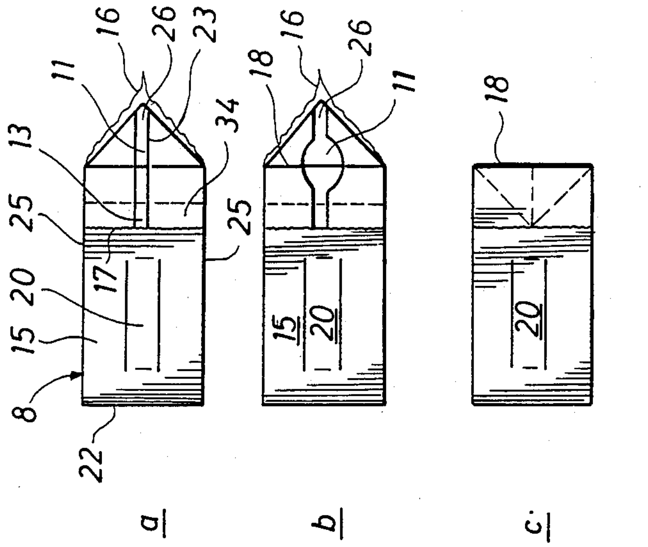
Figure 1:
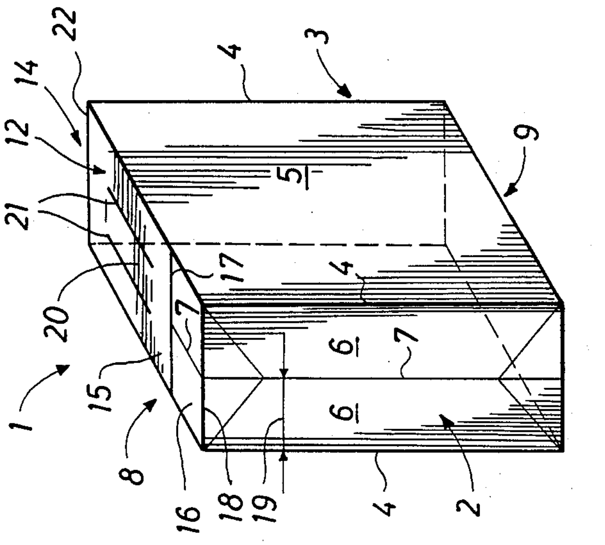
FIG. 1 is a perspective view of an inventive block bottom bag, FIGS. 2*a*, *b* and *c* are top views of the block bottom bag of FIG. 1 with two different discharge valves in an open position and with discharge valve in a closed position, respectively, FIGS. 3*a* and *b* illustrate two embodiments of the flap, FIGS. 4*a* and *b* illustrate two embodiments of a flap integral with the cover sheet.
Figure 3:
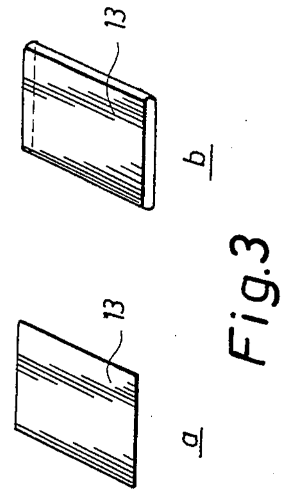
Figure 4:
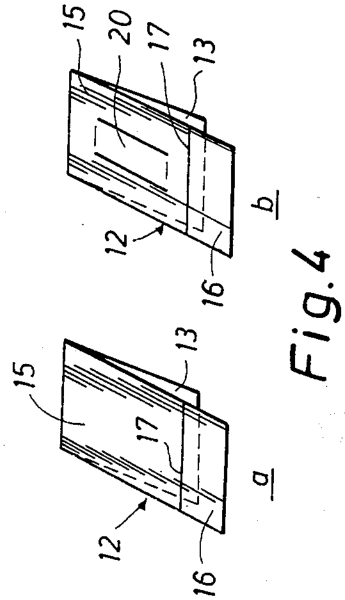
Figure 6:
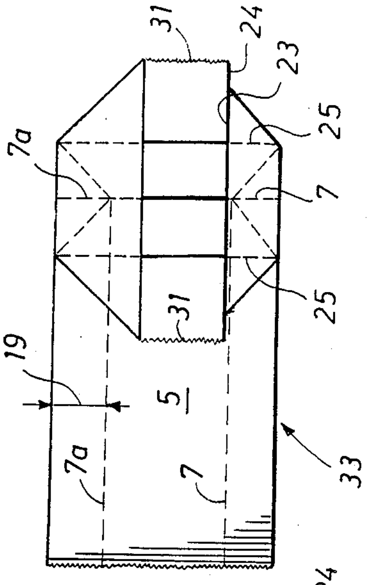
FIG. 6 illustrates the divided blank for the block bottom bag open in the leading end for forming the block bottom.
Figure 7:
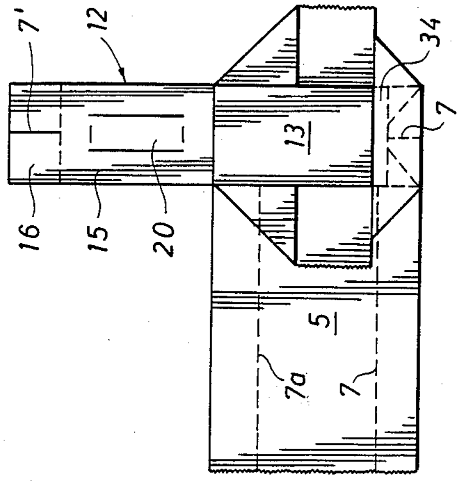
FIG. 7 illustrates the same as FIG. 6 during the insertion of a integrated flap/cover sheet with handle.
Figure 9:
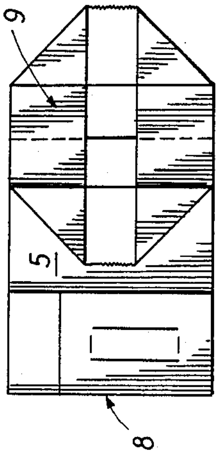
FIG. 9 illustrates the same as FIG. 8 after turning of the bag and during the forming of a block bottom without discharge valve at the other end.

FIGS. 1–10 illustrate a block bottom bag 1 and the manufacture thereof from an endless material 30. The bag 1 comprises in a manner known per se a tube-shaped blank provided with opposite gussets 2, 3, the outer folds 4 of which divide the length into two opposite side walls 5 and intermediate pairs of gusset walls 6, said gusset walls being interconnected in pairs along a middle fold 7 and each gusset wall being joined to the side walls 5 along an outer fold 4. The end areas of the blank are folded inward in a manner known per se for forming a block bottom 8, 9. Before the folding a part 10 is cut out of the gusset walls and the side walls at the end area to be folded to form the block bottom 8, cf. FIG. 5, for forming the discharge valve 11. Furthermore a flap 13 being an integral part of a cover sheet 12 is inserted in the block bottom, said flap forming a charging valve 14 for the bag together with the folded end of the block bottom. The cover sheet 12 is of the same dimensions as the block bottom 8 and is divided into a main section 15 and a tear-off section 16 to be torn off along a weakened belt or scoring line 17 parallel to the gusset side 18 of the block bottom at a distance therefrom corresponding to the gusset depth 19. The main section 15 includes a central section 20 divided by means of two intersections 21 parallel to the side walls 5 and stopping a short distance from the scoring line 17 and the gusset side 22 opposite the gusset side 18. The main section 15 of the cover sheet 12 with the exception of the central section 20 is glued to the outer surface of the block bottom 8. The tear-off section 16 is glued to the folded gusset walls 6 along the middle fold 7 with a strong glue, such as hot melt. The flap 13 is dimensioned in such a way that it extends from the gusset side 22 inward passed the scoring line 17 and out to the opposite side wall 5. At the gusset side 22 the flap is positioned outside the folded gusset walls 6 and at the gusset side 18 it is positioned inside the folded gusset walls 6 opposite the discharge valve. On its outer surface the flap is glued to outer folded end areas of the side walls 5, and further to the part of the main section 15 of the cover sheet extending out of the folded side walls 5 at the gusset side 22. This results in a free opening into the inside of the bag between the flap 13 and the folded gusset walls 6 at the gusset side 22. This opening operates as a charging valve and airing valve 14 for the bag 1. In FIG. 2 the bag is shown from a point of view perpendicular to the surface of the block bottom 8 and with open discharge valve 11. The discharge valve is opened by means of loosening the two webs of the tear-off section 16, the webs being situated on either side of the middle fold 7. Simultaneously the tear-off section 16 is torn off from the main section 15 along the scoring line 17, whereupon the folded gusset walls are folded out to the position shown in FIG. 2*a* by means of an outward pull at the webs. The resulting gap shaped opening in the discharge valve 11 is due to the missing part 10 cut out of the end area being limited by an intersection 23 perpendicular to the gusset side 18, cf. FIG. 5. The width of the opening of the discharge valve 11 is defined by the distance between the intersection 23 and the folding lines 25 of FIGS. 2*a* and 6, about which the end areas are folded to form the block bottom. In FIG. 2 said distance is slightly less than the gusset depth 19. The discharge valve 11 can also be formed with an enlarged opening, cf. FIG. 2*b*, by means of the intersection 23 having the shape of a curve or oblique line in relation to the one of FIG. 5. The illustrated form of the discharge valve 11 results in a practical spout 26 protruding passed the gusset side 18. The central section 20 is not glued to the block bottom 8 and acts as a handle. When lifting the handle during the pouring of the content it causes the forces to be distributed in the bag material in such a way that the block bottom 8 vaults slightly upward while the opposite side walls 5 are pulled inwardly against each other in the upper part of the bag. This contributes to forming the discharge valve 11 and the spout 26 and facilitates the pouring of the content. FIG. 2*c* illustrates how the discharge valve is closed after use by simply folding the protruding parts with the spout 26 about the gusset side 18. FIGS. 2*a*, 2*b* and 7 illustrate how the inner end of the inserted flap 13 acts as a labyrinth seal, when said end extends passed the free edge of the folded end areas of the gusset walls 6 at the discharge valve 11. This sealing effect occurs during the charging of the bag via the charging valve 14 at the gusset side 22 as well as during later use of the bag, cf. FIG. 2.

Figure 5:
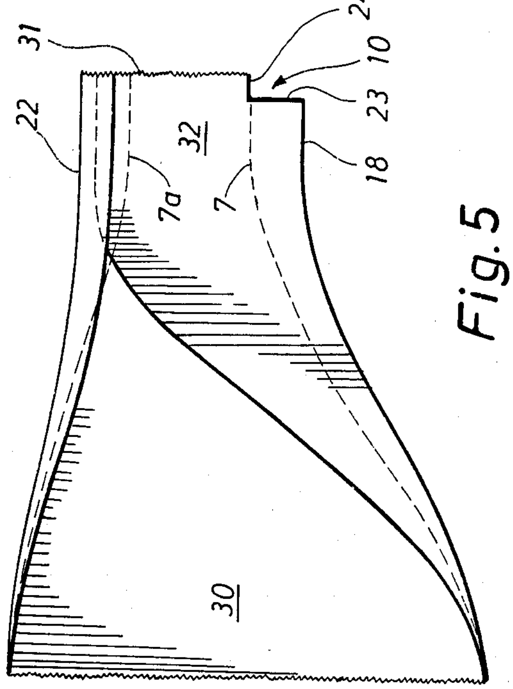
FIG. 5 illustrates the folding of a paper length to a tubing and the finished cut in the leading end for the discharge valve.
Figure 8:
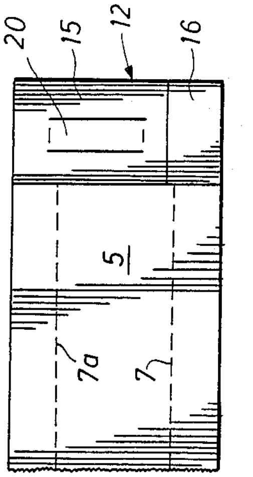
FIG. 8 illustrates a bag with folded block bottom with cover sheet in its leading end.
Figure 10:
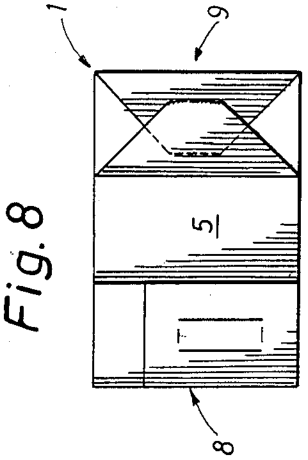
FIG. 10 illustrates the finished bag with block bottom at both ends.

FIGS. 5–10 illustrate several phases of the manufacture of the described bag 1 with combined charging, airing, discharge and closing valve with handle at one end and with a conventional block bottom at the other end from endless material 30. FIG. 5 illustrates schematically how the endless material 30 is folded to form a tubing 32, where two edges are glued together while simultaneously forming an inwardly facing gusset with middle folds 7 and 7*a*. The part 10 is cut out at the leading end 31 of the gusseted tubing 32, said part being defined by an intersection 24 parallel to the middle fold and just inside of said middle fold and the intersection 23 extending at right angles from the far end of the intersection 24 and out to the gusset side 18, resulting in the embodiment of the discharge valve 11 of FIG. 2*a*. A blank 33 is divided off the tubing 32, said blank corresponding to the length of the bag 1 to be manufactured. Optionally the part 10 can be cut out simultaneously in the subsequent blank 33. Then the end of the blank lacking the part 10 is folded in a manner known per se to form a block bottom, cf. FIG. 6 where the formed block bottom is defined by the gusset sides 18, 22 and the folding lines 25. Simultaneously the length of the end area participating in the forming of the block bottom is determined to be the distance between the edge 31 and the folding lines 25. Due to the missing cutout 10 the folded gusset walls from the gusset side 18 extend only just passed the middle fold 7, cf. FIG. 6, while the folded gusset walls from the opposite gusset side 22 extend considerably further in towards the middle of the tube, i.e. they extend along a length corresponding to the distance between the edge 31 and the folding line 25. The next step is the insertion of the flap 13 integrated with the cover sheet 12, cf. FIG. 7, in such a way that the flap 13 extends over the gusset walls folded from the gusset side 22 and that the free end area 34 of said flap is inserted under the gusset walls folded from the gusset side 18. The cover sheet 12 protrudes to the side of the blank 33. Then glue is applied to the areas of the bag outside of the flap between the intersection 24 and the folding lines 25 as well as the edge 31, whereupon these areas are folded in over the flap about the folding lines 25 and are glued to the flap as well as to each other in such a way that no sticking together is performed in the area between the intersection 24 and the gusset side 18 comprising the parts forming the discharge valve. Glue is then applied to an area of the resulting block bottom 8 with flap 13 corresponding to the main section 15 of the cover sheet 12 outside the central section 20. A stronger glue, such as hotmelt, is applied to an area around the middle fold 7 in the gusset walls folded from the gusset side 18, whereupon the cover sheet 12 is folded over the block bottom 8 and stuck fast to it. Then a conventional block bottom is prepared in predominantly the same way at the other end of the blank 33, with the exception of making a cutout in the end area and without inserting a flap with cover sheet, cf. FIGS. 9 and 10. In its flat embodiment the finished bag 1 is illustrated in FIG. 10, where the opposite side walls 5 are completely collapsed around the folded gusset walls, as indicated with the dotted middle folds 7, 7*a* and the block bottoms 8 and 9 are also folded flat over the upper side wall 5.

The bags are most suitably manufactured on an assembly or a machine for continuous manufacture from an endless material, such as a rolled-up paper length, but can, of course also be manufactured from an endless tubing with or without gussets as well as from blanks of such a tubing with gussets. During the continuous manufacture of the bag the blank is turned between the two foldings for the block bottom. The turning is usually performed in such a way that the block bottoms are folded in the leading end of the blank. The sequence for folding the two block bottoms is arbitrary and the block bottom 9 can optionally not be included or be formed as the block bottom 8 or another inventive block bottom.

Figure 11:
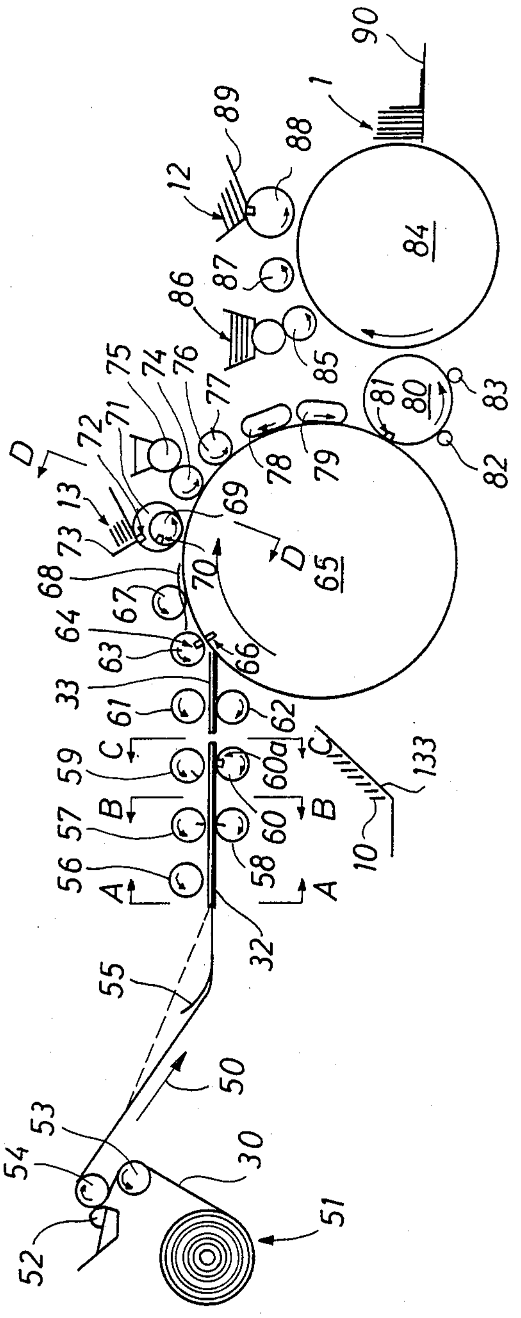
FIG. 11 illustrates the inventive assembly for continuous manufacture of bags with block bottoms with discharge valve and inserted flap as well as cover sheet from endless material.
Figure 12:
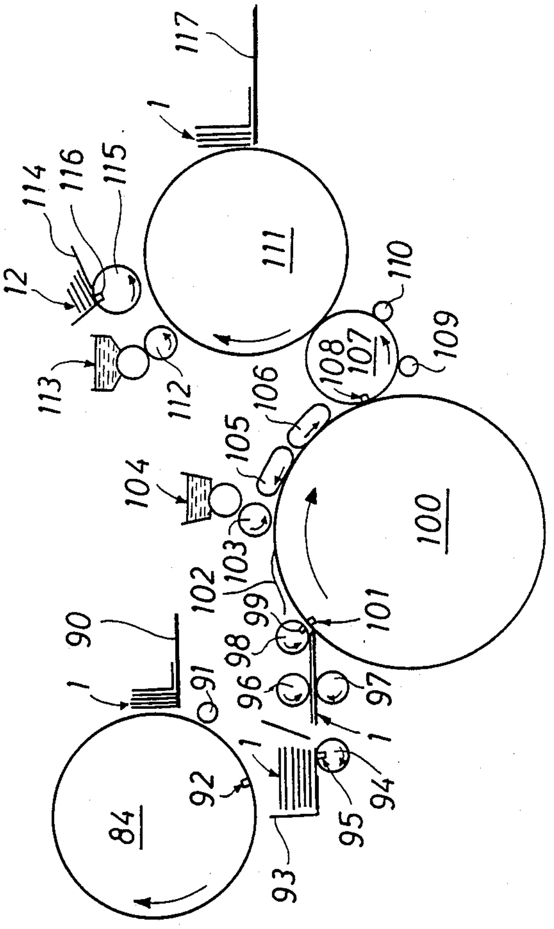
FIG. 12 illustrates the inventive assembly for continuous turning of bags and manufacture of the block bottoms in their other ends.

Although the described bag 1 is provided with two block bottoms, where one of them 8 is provided with a combined means including a flap, a cover sheet with handle and a tear-off section for the discharge valve, thus simultaneously establishing a charging/airing valve, the inventive container can have, as mentioned before, a form different from a bag and can also vary in many ways by combining different block bottoms or by just having one bottom. The most simple embodiment of the block bottom 8 does not include flap, cover sheet or handle and is only provided with a discharge valve arising from the cutout 10, where the folded end areas of the side walls 5 are fastened to the folded gusset walls opposite the discharge valve and/or are mutually fastened. Moreover the block bottom is optionally provided with a flap of different shapes and/or with a cover sheet with or without handle and/or with or without a tear-off section, and the two block bottoms 8, 9 can each include combinations of such embodiments. The flap 13 can comprise a single layer of material, cf. FIG. 3*a*, or a collapsed tube-shaped blank, cf. FIG. 3*b*, and each of them can optionally be an integral part of the described embodiments of the cover sheet 12, cf. FIGS. 4*a* and 4*b*, illustrating a flap with a single layer integrated with a cover sheet without handle, and a tube-shaped flap with a double layer integrated with a cover sheet with handle and tear-off section. FIGS. 11–17 illustrate an assembly for the manufacture of block bottom bags shown in FIGS. 1 and 10 by means of the above method from an endless paper length. FIGS. 11 and 12 are schematic lateral views of the assembly. Its structure and functions are described in the following.

The endless paper length is in form of a rolled-up supply 51 and is fed in the direction of the arrow 50 by means of draw-off rollers 53, 54 to a tubing means 55, where the length is folded to a tubing or hose 32 with overlapping edges. A roller 52 applies glue to one edge so that the two edges are glued together when pressed together in the edge assembling means 56 installed in the gusseting means for the manufacture of inwardly facing gussets with middle fold 7, 7*a*.

A roller puncher tool 57, 58 helping to feed the tubing 32 includes a cutting roller 57 and a corresponding matrix roller 58, said rollers simultaneously feeding the tubing 32 and making a cut to remove part 10 (cf. FIG. 5) for forming the discharge valve 11 (cf. FIG. 2). The tubing 32 is fed from the roller puncher tool through a blank divider 59, 60, where the roller 59 includes a transverse cutter and the roller 60 a matrix cooperating with said cutter. The two rollers divide off blanks corresponding to the length of a bag. The roller 60 furthermore includes suction cups 60*a* for removing the cutout 10 and letting it fall down into a tray 133. A pair of pulling-off rollers 61, 62 pulls the individual blank off after the blank division.

Then the blanks are transferred to the periphery of a first bottom cylinder 65 feeding the blanks further along and forming the first block bottom 8 in the leading end of the blank in cooperation with tools 63–79. First the end of the blank is opened by means of a roller 63 with suction cups 64 and corresponding suction cups 66 in the bottom cylinder 65 as well as a roller 67 with folding plates 68 and the gusset walls are folded to the position of FIG. 6. Then the flap 13 is inserted in each blank in the manner described above by means of an insertion means comprising rollers 69 and 71 with suction cups 70 and 72 respectively as well as a magazine 73 with flaps 13. Rollers 74 and 75 apply glue from a glue supply to the protruding parts of the side walls 5 of the blank to be glued to the block bottom or each other in the subsequent folding. A roller 76 with guide 77 presses the flat blank into the jaws of the bottom cylinder 65 so that folding tools 78 and 79 can fold the protruding side walls inward to form the block bottom 8. Subsequently an auxiliary cylinder 80 with suction cups 81 transfer the blank to a second bottom cylinder 84 by means of two support rollers 82 and 83.

The cover sheet 12 is laid on at the bottom cylinder 84. The cover sheet is either taken off by a transfer roller 88 from a magazine 89 as shown, or, in case of a cover sheet being connected to the previously inserted flap 13, is folded on top of the block bottom (not shown). In both cases the cover sheet 12 is glued to the block bottom by means of glue applied by a glue roller 85 from a glue supply 86. The hotmelt is applied to the parts of the gusset walls around the middle fold 7, where the tear-off section 16 is to be fastened by a roller 87 from a tear-off section supply. Simultaneously the cover sheet and the block bottom are pressed together by a roller 88.

In the next step the bags 1 provided with the block bottom 8 are either collected in a magazine 90 or, if they are to be provided with a second block bottom at the other end, fed by the bottom cylinder 84 supported by a support roller 91 and held by suction cups 92 in the bottom cylinder 84 to a turning means in form of a magazine 93 and a transfer roller 94 with suction cups 95. The transfer roller 94 is controlled by a subsequent third bottom cylinder 100 and takes the bags 1 from the magazine 93 and transfers the bags 1 now turned at 180° to a roller pair 96, 97 ensuring the correct feeding to the third bottom cylinder 100, whereupon the second block bottom 9 is formed.

The second block bottom 9 is in principle formed in the same manner as the first block bottom 8 by means of cylinders 100, 107 and 111 with corresponding tools 98–117. First the free end of the bag is opened by means of suction cups 99, 101 situated in a roller 98 and the bottom cylinder 100, respectively, and by means of folding plates 102 for folding the gusset walls 6, whereupon glue is applied from a glue supply 104 to the surfaces of the block bottom to be glued together by means of a glue roller 103. Then folding tools 105, 106 fold the protruding end areas of the side walls 5 to form the block bottom 9. The block bottom 9 is subsequently pressed together and formed between the bottom cylinder 100 and the cylinder 107.

The cylinder 107 then transfers the folded bag 1 to a fourth bottom cylinder 111 by means of suction cups 108 and support rollers 109, 110, whereupon the cover sheet 12 is optionally laid on and glued to the block bottom 9 by means of a glue roller 112 and a glue supply 113 as well as a transfer roller 115 with suction cups 116 for carrying and guiding the cover sheet 12 from a magazine 114. The then finished bag 1 is collected by a magazine 117.

Figure 13:
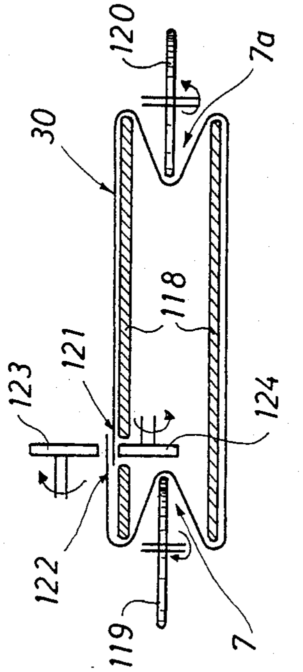
FIG. 13 is a sectional view along the line A—A of FIG. 11 illustrating the gusseting means and edge assembling means.

FIG. 13 is a sectional view along the line A—A of FIG. 11 through the gusseting means with edge assembling means. It comprises two spaced, parallel blank plates 118 around which the endless paper length 30 is folded to a tubing, so that the two edges 121, 122 overlap each other opposite the two rollers 123, 124 pressing and thus gluing the edges together, glue having been applied by the glue roller 52. The two edges can also be welded together by means of energy being supplied from the rollers 123, 124, said energy causing the softening of the plastic coating of the paper thus welding the two edges together. Gusset rollers 119, 120 simultaneously press the sides of the tubing in between the plates 118 for forming the gussets.

Figure 14:
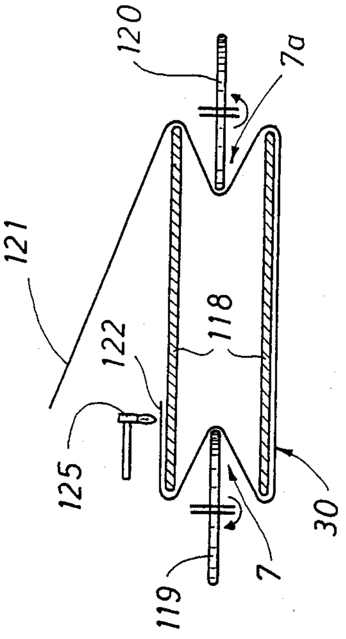
FIG. 14 illustrates the same as in FIG. 13 in a different embodiment.

FIG. 14 illustrates another embodiment of the edge assembling means, where, instead of the glue roller 52 applying glue, a heat-weldable coating of e.g. polyethylene is melted or softened at the edge 122 by means of a gas flame 125, whereupon the two edges 121, 122 are pressed together in the same way as illustrated in FIG. 13.

Figure 15:
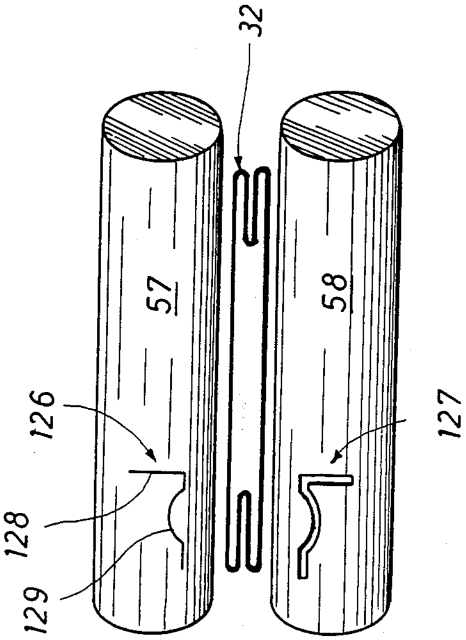
FIG. 15 is a sectional view along the line B—B of FIG. 11 illustrating the roller puncher tool for making the cut for the discharge valve.

FIG. 15 is a sectional view along the line B—B of FIG. 11 illustrating the profile of the gusseted tubing 32 and the roller puncher tool comprising the upper cutter roller 57 and the lower matrix roller 58, where the cutter roller 57 is provided with a cutter 126 with two webs 128, 129 situated in a normal plane to the roller 57 and a plane substantially axially to the roller 57, respectively. The roller puncher tool cuts out the part 10 in the tubing 32 for forming the discharge valve 11.

Figure 16:
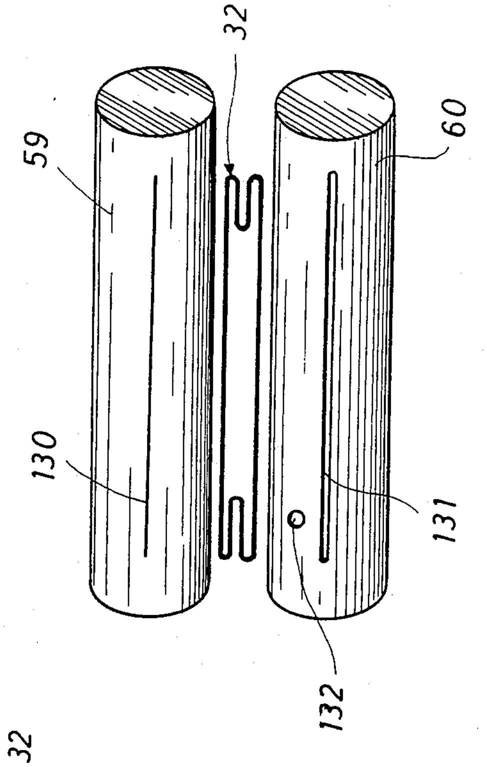
FIG. 16 is a sectional view along the line C—C of FIG. 11 illustrating the blank divider.

FIG. 16 is a sectional view along the line C—C of FIG. 11 illustrating the blank divider comprising an upper cutter roller 59 with a cutter 130 transverse to the tubing 32 and a lower roller 60 with a slot 131 corresponding to the cutter 130. The lower roller 60 further includes suction cups 132 for getting hold of the part 10 cut out by the roller puncher tool 57 and collecting it in the tray 133 of FIG. 11.

Figure 17:
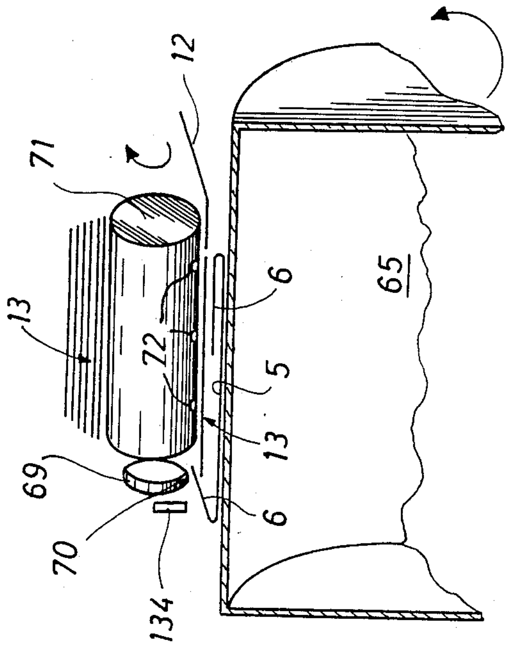
FIG. 17 is a sectional view along the line D—D of FIG. 11 illustrating the bottom cylinder and the insertion means for inserting the flap.

FIG. 17 is a sectional view along the line D—D of FIG. 11 illustrating parts of the bottom cylinder 65 with corresponding insertion means for inserting the flap 13 with or without integral protruding cover sheet 12. The insertion means comprises a roller 69 with suction cups 70 opposite the shortened, folded end area of the gusset walls 6 as well as a transfer roller 71 provided with suction cups 72 for taking out the flap and guiding it to the block bottom 8 in such a way that the flap 13 is inserted under the shortened, folded end area of the gusset walls 6 raised by the suction cups 70 and on top of the folded, not shortened gusset walls at the opposite gusset side 22. Before the flap is guided down a photocell 134 detects whether the block bottom is correctly positioned at the bottom cylinder 65. If so, it emits a signal for the insertion of the flap in the block bottom.

As mentioned before the assembly can also be used for the manufacture of block bottom bags from already divided gusseted blanks, where then the first means 51–56 are replaced by a magazine for these blanks and corresponding feeding means for the individual feeding of the blanks to a pair of rollers 57, 58 of FIG. 11. Correspondingly, the manufacture can be finished by collecting these bags 1 in a magazine 90 and thus not use the remaining part of the assembly, if the starting material is a bag with a block bottom already prepared at one end or if it is desired to manufacture bags with only one block bottom from blanks or the endless length 30.

Figure 18:
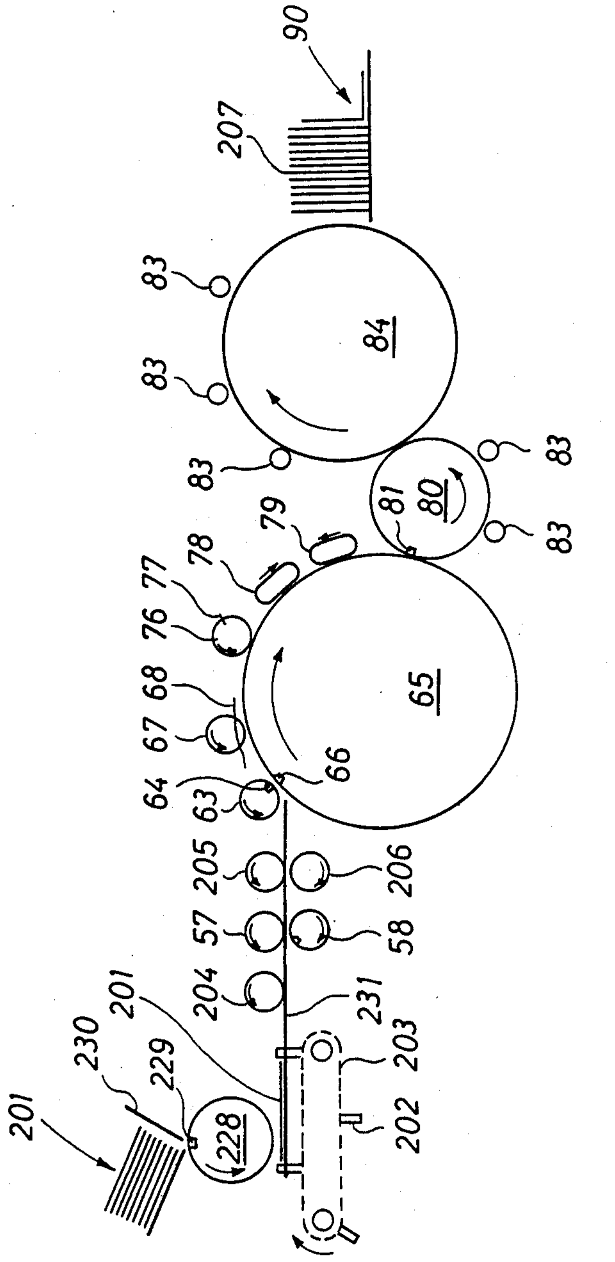
FIGS. 18 and 19 illustrate an alternative embodiment of the inventive assembly with only one block bottom folder for the manufacture of bags from tube-shaped, gusseted blanks or from bags with one block bottom.
Figure 19:
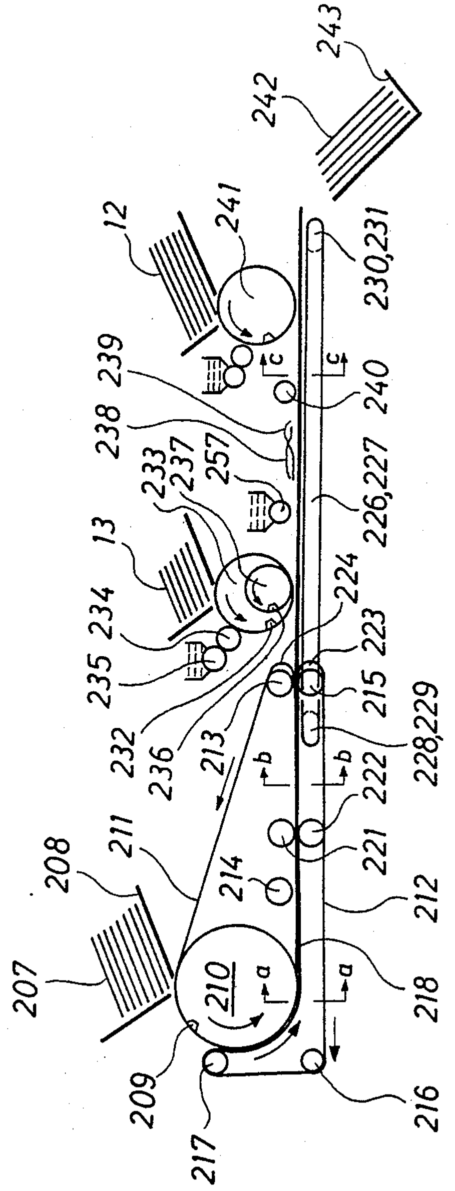

FIGS. 18 and 19 are schematic lateral views of an alternative embodiment of the inventive assembly using blanks in form of tube-shaped, gusseted blanks or bags with one block bottom as starting material and providing said blanks with an inventive block bottom. The assembly is in many ways analogous to the one of FIG. 11 but is divided into two parts. Thus a widespread use of identical reference numerals for analogous parts has been introduced.

FIG. 18 illustrates the first part of the alternative embodiment corresponding to the one of FIG. 11, where the feeding means 50–55 for the endless length 30 is replaced by a feeding means 201–204, 228–231 for a blank 201 from a magazine 230, and where further the means 69–75 and 85–89 for the insertion of the flap 13 and for the laying-on of the cover sheet 12 as well as the corresponding means for applying glue are omitted. The feeding means of FIG. 18 comprises a magazine 230 for the blanks 201, and a conveyor roller 228 with suction cups 229 conveying the blank and feeding it down to a belt-shaped support 231. Below said support a chain drive 203 is installed, said chain drive being provided with transfer arms 202 protruding through slots (not shown) of the belt-shaped support 231 during the movement of the chain drive in the direction indicated by an arrow. Thus the blank 201 is fed into engagement with a feeding roller 204. The feeding roller 204 feeds the blank 201 to the roller puncher tool 57, 58, wherefrom it is fed to into the bottom cylinder 65 by means of feeding rollers 205, 206. In the bottom cylinder 65 the blank is pre stamped for forming the block bottom as described in connection with the explanation of FIG. 11 with the exception of inserting the cover sheet and the gluing. From the bottom cylinder 65 the blank 207 provided with a pre-stamped block bottom is, as described above, fed to the magazine 90 by means of the auxiliary cylinder 80 and the bottom cylinder 84. In FIG. 18, as opposed to FIG. 11, the latter is not provided with means 85 89 for laying-on and gluing of the cover sheet. Instead the bottom cylinder 84 is provided with further support rollers 83 ensuring the correct transfer of a blank 207 to the magazine 90. Then the blanks 207 are collected in the magazine 90 each having a cutout for the discharge valve and a pre-stamped, unglued outwardly folded block bottom without flap and cover sheet.

FIG. 19 and sectional views 20, 21 and 22 illustrate the second part of the alternative embodiment of the inventive assembly. In this part with blank 207 as starting material the flap 13 is inserted and the cover sheet 12 laid on, including the application of glue, as well as the closing of the block bottom. In the latter step the blank 207 is orientated in such a way that the block bottom is turned 90° around an axis perpendicular to the bottom in relation to the feeding means of the blank seen in relation to the orientation of the block bottom in the first part of the assembly. In a magazine 208 the blank 207 is thus orientated such that the middle fold 7, **7*a*, cf. FIG. 6, is parallel to the axis of a conveyor roller 210 and transverse to the feeding direction of the second part of the assembly from the conveyor roller 210 to a magazine 243. The blank 207 is taken out of the magazine 208 by the conveyor roller 210 with suction cups 209 and fed down between two rotating conveyor belts 211, 212. Close to the one end of the conveyor roller 210 said conveyor belts grip and hold the leading right end 31 (cf. right-hand side of FIG. 6) of the block bottom of the blank along the right fold line 25 and as close to that as necessary for the further manufacture, cf. FIG. 20. The conveyor belt 211 runs over a roll 213 and the conveyor roller 210 and is further held down against the blank by means of one or more guide rolls 214. The conveyor belt 212 runs over rolls 215, 216 and 217 and between the conveyor belt 211 and the underlying support plate 218. Subsequent to the blank 207 being fed under the conveyor roller 210 it is fed from the conveyor roller 210 and over the support plate 218 by the conveyor belts 211, 212, so that the suction cups 209 are released. As a result the stem of the blank tilts down to an approximately vertical position. Then the left part 31 of the block bottom (left-hand side of FIG. 6) is gripped near its fold line 25 between a pair of conveyor belts 219, 220 running over rolls 222, 223 and 221, 224 respectively, and over a support plate 225, cf. FIG. 21. The rolls 221, 223 and the left edge of the support plate 225 are situated displaced on the right-hand side of the left edge of the support plate 218, cf. FIG. 19. The support plates 218 and 225 are mutually parallel to each other and extend to the magazine 243 at the end of the second part. They are only interrupted by transverse slots (not shown) for transfer of the conveyor belts 212 and 219 at the rolls 215 and 223. The support plates 218 and 225 are along their entire length separated by a longitudinal opening permitting the passage of the stem of the blank 207, cf. FIGS. 21 and 22. Below the support plates 218 and 225 the blank 207 is further held and fed between two endless belts 226, 227 rotatably guided around rolls 228, 229 between the rolls 221, 222 as well as 213, 215 and 223, 224 respectively, and rolls 230, 250 at the end of the support plates 218, 225 in front of the magazine 243**.

In the feeding direction behind the rolls 213 and 224 respectively and above the support plates 218 and 225 there is provided a first conveyor roller 233 with suction cups 232 for conveying the flap 13 from a magazine above the roller 233, as well as a corresponding means for applying glue with application rollers 234, 235 and a roller 237 with suction cups 236 for raising the shortened, folded part of the gusset walls 6 during the insertion of the flap 13 with regard to correct insertion of said flap. Furthermore an application means with roller 257 for applying the glue necessary for closing the block bottom is included as well as two fold arms 238, 239 behind the roller 257 for folding the side walls 5 protruding from the blank, which are to be glued together for forming the block bottom together with the flap, cf. FIGS. 7 and 8, and a subsequent pressing roller 240.

By means of the subsequent conveyor roller 241 with suction cups the cover sheet 12 is taken out from an upper magazine and, after the application of glue with application rollers corresponding to the rollers 234, 235 fed down to the folded block bottom and pressed against the bottom, whereupon the finished bag 242 with the finished folded block bottom is collected in the magazine 243.

Figure 20:
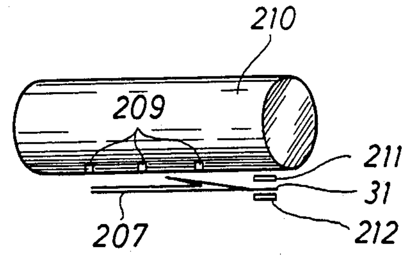
FIG. 20 is a sectional view along the line a—a of FIG. 19.
Figure 21:
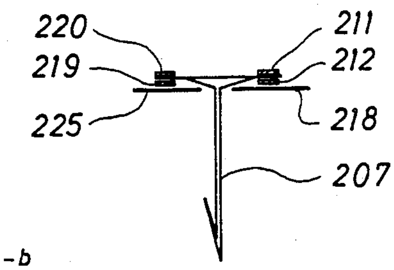
FIG. 21 is a sectional view along the line b—b of FIG. 19.
Figure 22:
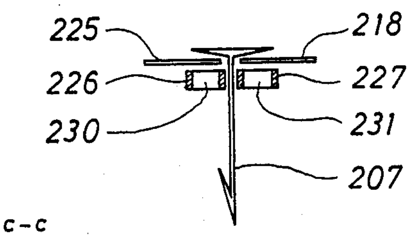
FIG. 22 is a sectional view along the line c—c of FIG. 19.

FIGS. 20, 21 and 22 are sectional views through parts of the assembly along the lines a—a, b—b and c—c, respectively of FIG. 19. FIG. 20 illustrates in greater detail how the blank is fed by the conveyor roller 210, the leading edge 31 of the block bottom orientated between the two conveyor belts 211, 212 at one end of the conveyor roller 210.

FIG. 21 illustrates how the blank is suspended between the two support plates 218, 225, its stem suspending through the opening between said plates and the outwardly folded side walls 5 of the block bottom being held between the belt pairs 211, 212 and 219, 220 respectively.

FIG. 22 illustrates how the blank is retained between the belt pair 226, 227, while the folded block bottom is opposite the support plates 218, 225 and the rest of the blank is suspended through the opening between said plates.

It is within the scope of the present invention that the assembly is composed of modules, so that new modules are easily inserted between and taken out of existing ones and the change from one blank to another is easily performed.

It is furthermore within the scope of the invention that the assembly is designed in such a way that the blank is fed horizontally, vertically or at an angle, and optionally process at both ends simultaneously.

I claim:

1. A container, especially a bag, of flexible material, such as paper, plastic film, foil or similar materials comprising a tube-shaped blank of said material divided by means of gussets into two opposite side walls and two intermediate pairs of gusset walls, and having at least one bottom of the block bottom type including a folded end area of said side walls and said pairs of gusset walls, wherein said container (1) including a tightly sealed, outwardly folding discharge valve (11) in one of the said block bottoms (8, 9), said valve being resealable and provided with a gripping means (16), and its opening being provided by means of shortening at least a part of the folded end areas of one pair of gusset walls (6) and adjacent side walls (5) to substantially the same length as the depth (19) of the gusset (2, 3).

2. A container as in claim 1, wherein at least parts of the shortened end areas are further shortened to a length shorter than the gusset depth (19) along straight and/or curved intersections (23) symmetrical around the middle fold (7).

3. A container of flexible material such as paper, plastic film, foil or similar material comprising a tube-shaped blank of said material divided by means of gussets into two opposite side walls and two intermediate pairs of gusset walls, and having at least one bottom of the block bottom type including a folded end area of said side walls and said pairs of gusset walls, said container (1) including a tightly sealed, outwardly folding discharge valve (11) in one of said block bottoms (8,9), said valve being resealable and provided with a gripping means (16), its opening being provided by shortening at least a part of the folded end areas of one pair of gusset walls (6) and adjacent side walls (5) to substantially the same length as the depth (19) of the gusset (2,3), said container (1) being provided with a cover sheet (!2) fastened to the outer surface of the block bottom (8,9) and with a tear-off section (16) on top of the discharge valve (11), said tear-off section acting as the gripping means (16) and being separately attached to the main section (15) of the sheet (12) along a weakened belt (17), said weakened belt extending substantially parallel to the gusset side (18) of the block bottom (8,9) and one gusset depth (19) apart from said gusset side (18) of the block bottom (8,9) and including tear-off means, the tear-off section (16) being fastened to the discharge valve (11) of bottom (8,9) in an area along the middle fold (7) and the main section (15) of sheet (12) being fastened to the block bottom (8,9) outside a central area of the main section (15) of sheet (12).

4. A container as in claim 3, wherein the container (1) is provided with an oblong central section (20) in the central area of the main section (15) and separated from the remaining part of the main section (15) along its longitudinal sides (21) and connected with the main section (15) along its narrow sides, where only those parts of the main section (15) situated outside the central section (20) are glued to the block bottom (8, 9), and additionally the longitudinally direction of the central section (20) is parallel to the connecting line between the opposing gusset sides (18, 22).

5. A container as in claim 3, wherein the container (1) is provided with a bottom flap (13) fastened to the inner side of the side walls (5) of the block bottom (8, 9), said flap (13) extending partially past the ends of the folded gusset walls (6) in the direction of the gusset side (18) of the container at the end of the block bottom (8, 9) with the discharge valve (11), and at the opposite end extending almost completely to the gusset side (22), and, in the transverse direction in relation hereto, having substantially the same dimensions as the block bottom (8, 9) and the flap (13) is situated inside the container (1) in relation to the walls (5, 6) of the block bottom at the end including the discharge valve (11), thus acting as an inner seal of the discharge valve (11), and at the opposite end of the block bottom the flap is situated between the folded gusset walls (6) and the side walls (5), said flap (13) comprising one or more partially interconnected layers of material.

6. A container as in claim 5, wherein the cover sheet (12) and the flap (13) are interconnected at the gusset side (22) opposite the discharge valve (11), being integrally formed and doubled back at said side (22).

7. A method for the manufacture of a container or a bag of flexible material, such as paper, plastic film, foil or similar materials, which comprises preparing an endless tubing feeding and gusseting the same and dividing it into tube-shaped, gusseted blanks corresponding to the individual container, whereupon one or both ends of the blank being folded to form the block bottom surfaces, where at first the two side walls, which have been put together face to face, are separated from each other and folded outward from the free end of the blank along a distance of between two and three times the gusset depth as from the free end of the blank, simultaneous with the inward folding of the gusset walls and part of the side walls from both gusset sides of the blank, whereupon the outwardly folded parts of the side walls are folded along the fold lines identical with the original outer folds of the folded gusset walls, and where optionally at least parts of the folded gusset walls are glued or welded together, wherein, prior to the dividing of the individual blanks (33), at least a part (10) of the leading end area of said blank in the area of one of the gussets (2, 3) is cut out along a first intersection (24) parallel and close to the middle fold (7) of the blank and a second intersection (23) transverse to the first one and at a distance of substantially at the most once the gusset depth (19) from the fold lines (25) around which the final folding of the side walls (5) is performed, and, in this final folding of the side walls (5), the welding or the application of glue is performed such that only those parts of the block bottom out of contact with the gusset walls (6), where the cutout has been performed, are glued or welded together.

8. A method for the manufacture of a container, or a bag, of flexible material, such as paper, plastic film, foil or similar materials, as described in claim 7, where a bottom surface is folded according to the block bottom principle at the one end of the tube-shaped, gusseted blank corresponding to a container with gussets or at the open end of a container with a previously formed block bottom during which at first the two side walls, which have been put together face to face, are separated from each other and folded outward from the free end of the container along a distance of between two and three times the gusset depth as from the free end, simultaneous with the inward folding of the folded gusset walls and parts of the side walls from the two gusset sides, whereupon the outwardly folded side walls are folded along the fold lines identical with the original outer folds of the folded gusset walls, and where optionally at least parts of the folded walls are glued or welded together, wherein at least a part (10) of the leading end area of the container (1) or blank (33) in the area of one of the gussets (2, 3) is cut out along a first intersection (24) parallel and close to the middle fold (7) of the said gusset (2, 3) and a second intersection (23) transverse to the first one and at a distance of substantially at the most once the gusset depth (19) from the fold lines (25) around which the final folding of the side walls (5) is performed, and in connection with this final folding of the side walls (5), the welding or the application of glue is performed in such a way that only those parts of the block bottom (8, 9) not in contact with the gusset walls (6), where the cutout has been performed, are glued or welded together.

9. A method as in claim 8, wherein a specially shaped cover sheet (12) is glued to the outer surface of the block bottom (8) subsequent to the final folding of the side walls (5), said cover sheet being divided into a tear-off section (16) and a main section (15) as well as an intermediate weakened belt (17), the gluing being performed in such a way that the tear-off section (16) is glued to the parts of the gusset walls (6) forming the discharge valve (11) along an area around its middle fold (7) and with the weakened belt (17) situated substantially on top of the free end of these gusset walls (6), while the main section (15), with the exception of the central section (20) separated from the main section along two opposite sides (21) but connected thereto at the ends thereof, is glued in such a way to the remaining part of the outer surface of the block bottom (8) that the central section (20) is usable as a handle for the container (1).

10. A method as in claim 9, wherein a flap (13) is inserted in the block bottom (8) prior to the final folding of the side walls (5) in such a way that the flap (13) extends across the folded gusset walls (6) at the gusset side (22) without cutout and partially inside below the folded gusset walls (6) with cutouts, while the gusset walls (6) are kept at an upwardly and downwardly inclined position, whereupon the flap (13) is glued or welded to the folded side walls (5) during the final folding of said side walls (5).

11. A method as in claim 10, where the free end of the main section (15) of the cover sheet (12) opposite the tear-off section (16) is integral with the end of the flap (13) extending across the folded gusset walls (6) without cutout, wherein the cover sheet (12) is inserted together with the flap (13) in a protruding position, whereupon the cover sheet (12) is folded over the block bottom (8) and glued to the outer surface thereof subsequent to the folding and fastening of the side walls (5).

12. An apparatus for the continuous manufacture of a tube-shaped container closed at one or both ends by means of a block bottom, from an endless tubing or a strip-shaped length of flexible material comprising a tubing means, a gusseting means, a blank divider, a first block bottom folder, a turning means and a second block bottom folder, an edge assembling means (56) cooperating with the gusseting means (118, 119, 120) for gluing the edges (121, 122) of the length (30), a roller puncher tool (57, 58) between the gusseting means (118, 119, 120) and the first block bottom folder (63–79) for making a cut for a discharge valve (11) in one of the gusset areas (2, 3), a gripping means (60*a*, 133) adjacent the blank divider (59, 60) for removing and collecting superfluous, punched out material (10), an insertion means (69–73) in the first block bottom folder for inserting the flap (13) in the opened block bottom (8), and an layer-on means (84–89) behind the first block bottom folder for laying on and fastening of the cover sheet (12).

13. An apparatus assembly for the manufacture of a tube-shaped container closed at one or both ends by means of a block bottom, especially a bag, with a block bottom of flexible material, according to the apparatus described in claim 12, and comprising only one block bottom folder, wherein the apparatus comprises a roller puncher tool (57, 58) in front of the block bottom folder (63–79) for making a cut (23, 24) for the discharge valve (11) in one of the gusset areas (2, 3), a gripping means (60*a*, 133) for removing and collecting superfluous, punched out material (10) , an insertion means (69–73) in the block bottom folder (63–79) for inserting the flap (13) in the opened block bottom (8), and a layer-on means (84–89) behind the block bottom folder for laying on and fastening of the cover sheet (12).

14. An apparatus as in claim 13, wherein the roller puncher tool (57, 58) for making a cut (23, 24) for the discharge valve (11) comprises a pair of rollers (57, 58) surrounding the length (32) including a cutting roller (57) and a correspondingly shaped matrix roller (58), where the cutter is L-shaped and provided with a first web (128) in a normal plane to the axis of the cutting roller (57) opposite one middle fold (7) of the gusseted tubing, and with a second web (129) extending from the one end of the first web (128) passed the side edge of the tubing (32), at least partially curved and with the convex side facing the same side as the first web.

15. An apparatus as in claim 14, wherein the gripping means (60*a*, 133) for removing and collecting superfluous, punched-out material (10) comprises suction cups (132) in the bottom roller (60) of a set of cutting rollers (59, 60) for the punching-out of said material (10), as well as a collecting tray (133) below said bottom roller (60).

16. An apparatus as in claim 15, wherein the tools (126, 127, 130, 131) for making cuts (23, 24) for the discharge valve (11) and cuts (31) for the division of the blanks (33), as well as the suction cups (132) for removing punched-out, superfluous material (10) are installed in the same set of rollers.

17. An apparatus as in claim 16, wherein the insertion means (69–73) for inserting the flap (13) in the block bottom (8) comprises a bottom cylinder (65) and a roller (69) with suction cups (70) mounted at the periphery of said cylinder (65) for raising the gusset walls (6) folded at the side of the discharge valve (11), a magazine (73) for flaps (13) and a roller (71) with suction cups (72) mounted at the periphery of the bottom cylinder (65) for taking out the flap (13) from the magazine (73) and guiding it down to the block bottom (8) below the raised gusset walls (6), as well as corresponding moving and control means, the control means comprising a photo-cell (134) for detecting a correctly positioned container (1) in the assembly and for transmitting a signal to means (69–73) for guiding down the flap (13) to the block bottom (8), when the container (1) is in the correct position

18. An apparatus as in claim 17, wherein the layer-on means (84–89) for laying on and fastening of the cover sheet (12) comprises a set of rollers (85) cooperating with a separate bottom cylinder (84) for the application of glue (86), and a folding mechanism (not shown) for folding a cover sheet (12) integral with an inserted flap (13) and protruding from the block bottom (8) over said block bottom as well as a magazine (89) for cover sheets (12) and a roller (88) with suction cups for taking out and guiding down of the individual cover sheet (12) from the magazine (89) to the block bottom (8) and for pressing the cover sheet (12) onto the outer surface of the block bottom (8).

19. An apparatus as in claim 18, wherein the edge assembling means (56) cooperating with the gusseting means for gluing of the side edges (121, 122) of the length (30) comprises a heating unit (123, 124, 125), for melting or softening of a glue or the surface material of the length (30) on one side edge (122) of the length (30) as well as means, such as pairs of rollers (123, 124), for pressing the two side edges (121 122) against each other.

* * * * *

UNITED STATES PATENT AND TRADEMARK OFFICE
CERTIFICATE OF CORRECTION

PATENT NO. : 4,881,825

DATED : November 21, 1989

INVENTOR(S) : Ejvind H. B. Olesen

It is certified that error appears in the above-identified patent and that said Letters Patent is hereby corrected as shown below:

First Page, the name of the inventor should correctly read
-- Ejvind H.B. Olesen--

Claim 1, line 1, ", especially" should be deleted, substitute "or".

Claim 7, line 6, "whereupon" should be deleted

Claim 12, line 2, -- or bag -- should be inserted after "container"

Signed and Sealed this

Thirtieth Day of October, 1990

*Attest:*

HARRY F. MANBECK, JR.

*Attesting Officer*

*Commissioner of Patents and Trademarks*